(12) United States Patent
Hein et al.

(10) Patent No.: US 8,555,651 B2
(45) Date of Patent: Oct. 15, 2013

(54) TEMPERATURE MEASURING DEVICE, GAS TURBINE HAVING A TEMPERATURE MEASURING DEVICE AND METHOD FOR DIRECTLY DETERMINING THE TEMPERATURE IN A COMBUSTION CHAMBER

(75) Inventors: Olaf Hein, Mülheim an der Ruhr (DE); Michael Minne, Voerde (DE)

(73) Assignee: Siemens Aktiengesellschaft, München (DE)

( * ) Notice: Subject to any disclaimer, the term of this patent is extended or adjusted under 35 U.S.C. 154(b) by 883 days.

(21) Appl. No.: 12/724,633

(22) Filed: Mar. 16, 2010

(65) Prior Publication Data

US 2010/0236251 A1    Sep. 23, 2010

(30) Foreign Application Priority Data

Mar. 17, 2009 (DE) .................. 10 2009 013 595

(51) Int. Cl.
*G01K 13/02* (2006.01)
(52) U.S. Cl.
USPC .............. 60/752; 374/144; 431/75; 60/772
(58) Field of Classification Search
USPC ............ 60/752–760, 772; 374/141, 144–145; 431/66, 74–75; 165/11.1
See application file for complete search history.

(56) References Cited

U.S. PATENT DOCUMENTS

| | | | |
|---|---|---|---|
| 3,483,750 A * | 12/1969 | Pratt | 374/116 |
| 3,874,239 A * | 4/1975 | Finney | 374/147 |
| 3,899,878 A * | 8/1975 | Compton et al. | 60/39.281 |
| 4,023,411 A * | 5/1977 | Escher | 136/233 |
| 4,244,221 A * | 1/1981 | Scott | 374/144 |
| 4,477,687 A * | 10/1984 | Finney | 136/229 |
| 4,597,675 A * | 7/1986 | Maertins et al. | 374/115 |
| 4,948,264 A | 8/1990 | Hook, Jr. | |
| 5,080,496 A | 1/1992 | Idelchik | |
| 5,577,378 A | 11/1996 | Althaus | |
| 5,642,717 A * | 7/1997 | Gilman et al. | 123/481 |
| 6,050,078 A | 4/2000 | Paschereit | |
| 6,607,302 B2 * | 8/2003 | Lyle | 374/185 |
| 6,805,483 B2 | 10/2004 | Garry | |
| 6,843,061 B2 * | 1/2005 | Parker et al. | 60/772 |
| 6,983,603 B2 * | 1/2006 | Macchia | 60/772 |
| 7,111,982 B1 | 9/2006 | Swonger, Jr. | |

FOREIGN PATENT DOCUMENTS

DE    1476778 A1    5/1969

\* cited by examiner

*Primary Examiner* — William H Rodriguez
*Assistant Examiner* — Carlos A Rivera

(57) ABSTRACT

A temperature measuring device is provided. The temperature measuring device measures the temperature in a combustion system, in particular for that of a combustion system of a gas turbine. The temperature measuring device is equipped with a heat absorbing element disposed in or on the combustion system, a measurement end disposed remotely from the combustion system having, disposed thereon, a temperature sensor measuring the temperature of the measurement end, a heat conducting element which connects the heat absorbing element to the measurement end in a thermally conductive manner, and a cooling device acting on the heat conducting element in a quantifiable manner for heat removal. A gas turbine having a temperature measuring device and method for directly determining the temperature in a combustion chamber are also provided.

20 Claims, 3 Drawing Sheets

TEMPERATURE MEASURING DEVICE, GAS TURBINE HAVING A TEMPERATURE MEASURING DEVICE AND METHOD FOR DIRECTLY DETERMINING THE TEMPERATURE IN A COMBUSTION CHAMBER

CROSS REFERENCE TO RELATED APPLICATIONS

This application claims priority of German application No. 10 2009 013 595.2 DE filed Mar. 17, 2009, which is incorporated by reference herein in its entirety.

FIELD OF INVENTION

The present invention relates to a temperature measuring device for measuring the temperature in a combustion system, in particular in a gas turbine combustion chamber. The invention also relates to a gas turbine with a combustion system incorporating a temperature measuring device. The invention lastly relates to a method for directly determining the temperature in a combustion chamber, in particular in a gas turbine combustion chamber.

BACKGROUND OF INVENTION

The temperature in the combustion system of a gas turbine, e.g. in a gas turbine combustion chamber, has hitherto generally been determined by measuring the temperature at the turbine's exhaust outlet. From the measured turbine outlet temperature, the temperature in the combustion chamber is calculated allowing for the expansion and cooling undergone by the hot combustion gases in the turbine. The temperature in the combustion chamber has hitherto not been measured directly, as the temperature sensors used cannot be operated in the temperature range obtaining in the combustion chamber.

However, the temperature in the combustion chamber is a variable which is used to control the amount of fuel supplied to the combustion process. Whereas measuring the temperature at the turbine outlet allows the temperature in the combustion chamber to be deduced sufficiently well for controlling single-stage combustion, in the case of two-stage sequential combustion, as described e.g. in U.S. Pat. No. 6,050,078, it is difficult or even quite impossible to determine the temperature in the upstream combustion chamber with sufficient accuracy. Therefore, the problem of controlling two-stage sequential combustion on the basis of the turbine outlet temperature has hitherto not been satisfactorily resolved. This is the case particularly when a turbine stage is disposed between the upstream combustion chamber and the downstream combustion chamber, as described in U.S. Pat. No. 5,577,378, for example.

SUMMARY OF INVENTION

The object of the present invention is therefore to create a temperature measuring device enabling the uncertainties in determining the temperature obtaining in a combustion system, e.g. a gas turbine combustion chamber, to be reduced. A second object of the present invention is to provide an advantageous gas turbine. A third object of the present invention is to provide an advantageous method for determining the temperature in a combustion system, e.g. in a gas turbine combustion chamber.

The first object is achieved by a temperature measuring device as claimed in the claims, the second object by a gas turbine as claimed in the claims and the third object by a method as claimed in the claims. The dependent claims contain advantageous embodiments of the invention.

An inventive temperature measuring device for measuring the temperature in a combustion system comprises a heat absorbing element disposed in or on the combustion system, a measurement end disposed remotely from the combustion system and having disposed thereon a temperature sensor measuring the temperature of said measurement end, and a heat conducting element which connects the heat absorbing element to the measurement end in a thermally conductive manner. It additionally comprises a cooling device having a quantifiable heat dissipating effect on the heat conducting element. In particular, the heat absorbing element disposed in a combustion system can be planar or three-dimensional here. A planar heat absorbing element can be constituted by a section of a hot gas path wall of the combustion system, for example. A three-dimensional heat absorbing element can be, for example, an element projecting into the combustion system. Irrespective of whether the heat absorbing element is planar or three-dimensional, it can be implemented as an integral surface or an integral section of the heat conducting element, thereby allowing particularly good transfer of heat from the heat absorbing element to the heat conducting element, although this is not absolutely necessary in the context of the invention. The combustion system can comprise in particular a gas turbine combustion chamber or a number of sequentially flowed-through combustion chambers, the heat absorbing element being disposed in a combustion chamber or in a flow path between two combustion chambers.

The temperature measuring device according to the invention provides a method for directly determining the temperature in a combustion system, e.g. the temperature in a gas turbine combustion chamber, in which a quantity of heat from the combustion system is absorbed by means of the heat absorbing element. The absorbed quantity of heat is then transmitted by means of the heat conducting element to a temperature sensor disposed remotely from the combustion system, heat being quantifiably removed from the quantity of heat during the transmission. Consequently, the quantity of heat arriving at the temperature sensor is reduced by a quantifiable amount compared to the quantity of heat absorbed. The actual temperature measurement then takes place on the basis of the reduced quantity of heat, it being only after heat removal and the associated temperature reduction at the location of the temperature sensor that temperature measurement by means of the temperature sensor becomes possible at all. The temperature in the combustion system, e.g. in the gas turbine combustion chamber cited by way of example, is finally determined on the basis of the actual temperature measurement and the amount of heat removed.

In the inventive device and/or in the inventive method it is therefore unnecessary to expose the actual temperature sensor to the high temperatures obtaining in the combustion system. Instead, only the heat absorbing element is subjected to these temperatures and the absorbed heat is then transmitted to a remote temperature sensor. During transmission of the absorbed quantity of heat to the measurement end, enough heat is removed to enable the temperature at the measurement end to be measured using a conventional temperature sensor.

The heat dissipation during the transmission of heat from the heat absorbing element to the measurement end can be quantified e.g. by calibration in the course of commissioning the combustion system, e.g. at commissioning of a gas turbine.

It is also advantageous if at least one temperature sensor measuring the temperature of the heat conducting element is disposed on the heat conducting element itself. Said sensor should preferably be disposed in a section of the heat conducting element in which the temperature has already dropped to the point that conventional temperature sensors can be used for temperature measurement. On the basis of the temperature measurement using the temperature sensor disposed on the heat conducting element, corrections can then be performed if the conditions during operation of the combustion system, e.g. in the gas turbine mentioned, are at variance with those during the calibration phase. Such a discrepancy would result in a noticeable difference between the temperature measured on the heat conducting element and the temperature measured during the calibration phases.

In particular, a cooling fluid duct in which the heat element is disposed can be used as a cooling device. Such a cooling fluid duct is present in many combustion systems, e.g. in the form of a cooling fluid duct surrounding a wall of the combustion system for cooling purposes. In gas turbines, such cooling fluid ducts are generally fluidically connected to the compressor output so that compressor air flows through them. If, in the context of the invention, heat is quantifiably removed by means of such a cooling fluid flow, the amount of heat removed can also be determined, for example, from the amount of heat absorbed by the cooling fluid flow. At the same time, the removal of heat from the heat conducting element can be suitably adjusted by suitably controlling or regulating the flow of cooling fluid. Different compressor air flows occurring during different operating states of the gas turbine can be taken into account in the calibration process.

In order to improve the heat removal from the heat conducting element, the latter can have a large surface area geometry or be connected in thermally conductive manner to an element having a large surface area, in particular cooling fins. However, cooling-fin-like structures can also be incorporated directly into the surface of the heat conducting element to make them larger.

In order to protect the heat absorbing element itself from the temperatures obtaining in the combustion chamber and thus extend its useful life, it can have a coating with defined heat insulating and/or anti-oxidation properties, e.g. a ceramic heat insulating layer. The degree of heat insulation can be determined in the calibration process.

It is advantageous if the heat conducting element and/or the heat absorbing element consist of a material that can withstand high temperatures, such as tungsten, rhenium, etc., or of a combination of such materials.

A gas turbine according to the invention has at least one combustion system which is equipped with at least one temperature measuring device according to the invention. In the context of the gas turbine according to the invention, the heat conducting element of the temperature measuring device can be disposed in particular at least partly in a cooling fluid circulating region surrounding the combustion system, e.g. a plenum or a cooling air duct, so that heat can be removed by means of the cooling fluid flow. In particular, the compressor output can be fluidically connected to the cooling fluid circulating region so that the cooling fluid is implemented by compressor air. As such arrangements are frequently encountered nowadays in gas turbines, the removal of heat from the heat conducting element can be implemented without major design changes to existing gas turbines.

If the gas turbine comprises a combustion system with at least two combustion chambers disposed axially in series and flowed through sequentially, at least the upstream combustion chamber is equipped with at least one temperature measuring device according to the invention. While the temperature of the downstream combustion chamber can still be determined in a sufficiently satisfactory manner from the temperature at the turbine outlet, this is no longer the case for the temperature in the upstream combustion chamber. It is therefore advantageous if at least the temperature of the latter combustion chamber is determined directly by means of a temperature measuring device according to the invention. Self-evidently, it is also possible to determine the temperatures in both combustion chambers by means of the temperature measuring device according to the invention. This is the case, in particular, if at least one turbine stage is disposed between the two combustion chambers disposed axially in series. As another alternative, it is also possible to measure the temperature in a flow path between the two combustion chambers.

BRIEF DESCRIPTION OF THE DRAWINGS

Further features, characteristics and advantages of the present invention will emerge from the following description of exemplary embodiments with reference to the accompanying drawings in which.

DETAILED DESCRIPTION OF INVENTION

Figure 1:
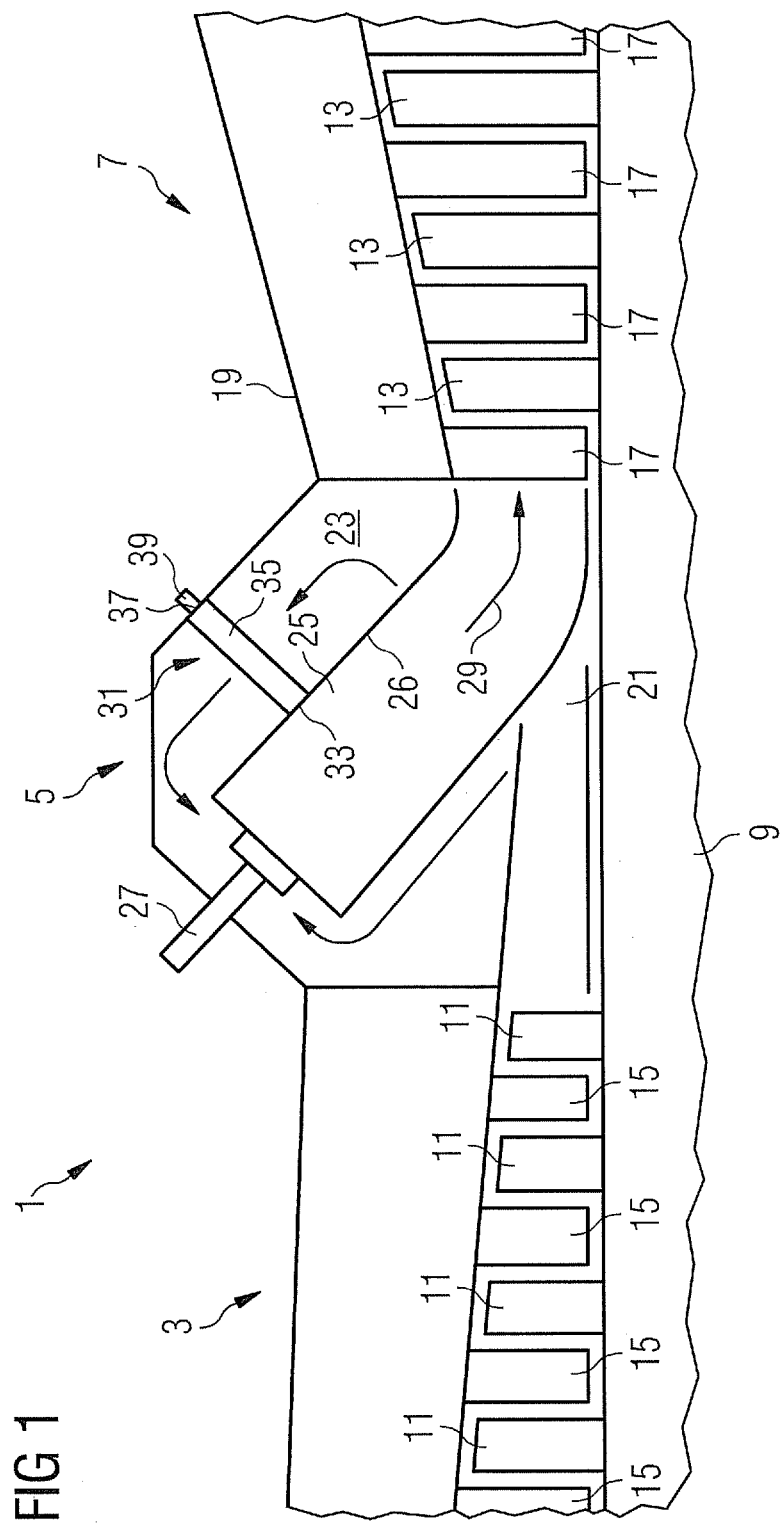
FIG. 1 shows a first exemplary embodiment of a gas turbine with a temperature measuring device according to the invention.

FIG. 1 shows a first exemplary embodiment of a gas turbine 1 with a temperature measuring device according to the invention in a simplified longitudinal section. The gas turbine 1 comprises a compressor section 3, a combustion chamber section 5 and a turbine section 7.

A shaft 9 extends through all the sections of the gas turbine 1. In the compressor section 3, the shaft 9 is equipped with rows of compressor rotor blades 11 and in the turbine section 7 with rows of turbine rotor blades 13. Interleaved between the moving blade rows in the compressor section 3 and turbine section 7 are rows of compressor stator blades 15 and rows of turbine stator blades 17 respectively. The stationary blades extend from the casing 19 of the gas turbine plant 1 essentially in the radial direction of the shaft 9.

The combustion chamber section 5 comprises a combustion chamber plenum 23 with a combustion system disposed therein which in this example comprises at least one combustion chamber 25. Compressed air—also termed compressor air—and a liquid or gaseous fuel can be fed from the compressor section 3 to the combustion chamber 25 via at least one burner 27 disposed on the combustion chamber 25. In this exemplary example, the combustion chamber 25 is one of a number of can-type combustors distributed around the shaft 9. However, it is also possible to implement the combustion chamber 25 as an annular combustor completely encircling the shaft.

During operation of the gas turbine 1, air is sucked in through an air inlet (not shown) of the compressor section 3 and compressed by the compressor rotor blades 11. The compressor air is then guided through a compressor output 21 to the combustion chamber plenum 23. From there it flows over a burner 27 into a combustion chamber 25 disposed in the combustion chamber plenum 23. A gaseous or liquid fuel which is mixed with the compressor air is also passed through the burner 27. The resulting air/fuel mixture is then combusted in the combustion chamber 25. Alternatively, the fuel can also be injected directly into the flame in the combustion chamber 25 without being mixed with air beforehand.

The hot exhaust gases produced in the combustion chamber flow along the flow path 29 from the combustion chamber 25 into the turbine section 7, where they expand and cool down, transferring momentum to the turbine rotor blades 13 as they do so. The turbine stator blades 17 serve here as jets for optimizing the momentum transfer to the rotor blades 13. The rotation of the shaft 9 brought about by the transfer of momentum is used to drive a load, e.g. an electric generator. The expanded and cooled combustion gases are finally discharged from the gas turbine 1 through an outlet (not shown).

In order to be able to measure the temperature in the combustion chamber 25, the gas turbine 1 has a temperature measuring device 31 comprising a heat absorbing surface 31 disposed in the combustion chamber 25, a heat conducting element 35 coming from the heat absorbing surface 31 and extending through the combustion chamber plenum 23, and a temperature sensor 39, e.g. a thermocouple, disposed on a measurement end 37 of the temperature measuring device 31. In the present exemplary embodiment, the heat absorbing surface 33 is incorporated into the combustion chamber wall 26. Alternatively, instead of a heat absorbing surface, a heat absorbing element projecting into the combustion chamber can be present.

In this exemplary embodiment, the heat absorbing surface 33 is implemented as an end face of the heat conducting element 35. In particular, the heat absorbing surface 33 can also be provided with a heat-insulating layer and/or an anti-oxidation coating, as is also typically used in the other sections of the combustion chamber wall 26. The end face at the other end of the heat conducting element 35 constitutes the measurement end 37 of the temperature measuring device 31 at which the actual temperature measurement is performed.

Figure 2:
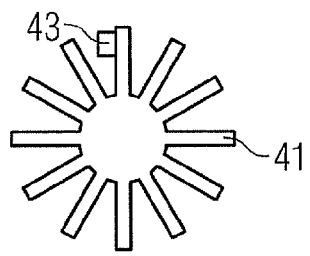
FIG. 2 shows a detail from FIG. 1.

The heat absorbing element 33 and the heat conducting element 35 are made from high-temperature materials. Suitable high-temperature materials are e.g. tungsten, rhenium or combinations of these materials. The heat conducting element 35 moreover has a surface in which cooling fins 41 are implemented to increase the surface area. A cross-section of the heat conducting element 35 is shown in FIG. 2. Instead of forming the cooling fins 41 in the heat conducting element 35 itself, it is also possible for a heatsink to be mounted to the outer surface of the heat conducting element 35. However, the advantage of the first mentioned variant is that the heat transfer is better due to the absence of material boundaries than the heat transfer in the case of a heatsink mounted in this way. Irrespective of the variant selected, however, the enlarged surface area of the heat conducting element 35 results in improved heat transfer to the compressor air flowing past and therefore increased cooling of the heat conducting element 35.

During operation of the gas turbine, compressor air from the compressor output 21 flows along the heat conducting element 35 to the burner 27. As it does so, heat is removed from the heat conducting element 35 so that the measurement end 37 is cooler than the heat absorbing surface 33. This cooling is great enough for the temperature at the measurement end to be so much lower than the temperature on the heat absorbing surface that conventional temperature sensors, e.g. thermocouples, can measure the temperature of said surface.

In order to be able to infer the temperature in the combustion chamber 25 from the temperature measurement at the measurement end 37, calibration is performed during commissioning of the gas turbine, e.g. during initial startup or restart. In this procedure, the temperatures in the combustion chamber are determined as a function of the operating state of the gas turbine and the measured value at the measurement end 37. The temperatures determined can then be stored together with the associated measured values and operating states in a table which is then used e.g. for controlling the fuel supply to the burner 27. In order to be able to perform corrections during operation of the gas turbine which are necessitated by the conditions during operation being different from those obtaining at calibration, the heat conducting element 35 can be equipped with one or more temperature sensors 43, e.g. in the form of thermocouples.

Figure 3:
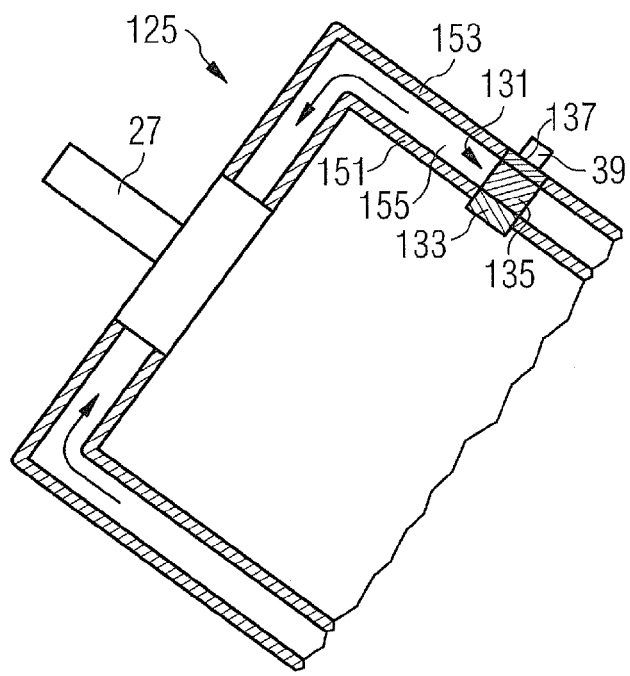
FIG. 3 shows a second exemplary embodiment of the gas turbine with a temperature measuring device according to the invention.

A second exemplary embodiment of a gas turbine having a temperature measuring device according to the invention is shown in part in FIG. 3. The Figure shows a section of a combustion chamber 125 of the gas turbine which is equipped with a temperature measuring device 131 according to the invention. The other elements of the gas turbine in the second exemplary embodiment correspond to those of the first exemplary embodiment and will not therefore be explained again.

The gas turbine shown in part in FIG. 3 differs from the gas turbine illustrated in FIG. 1 in that it has a closed cooling system for cooling a combustion chamber wall. In such a closed cooling system, compressor air is guided through cooling ducts running along the inner combustion chamber wall to the burner and fed from there to the combustion process.

FIG. 3 shows a sectional view of a part of a closed cooling system combustion chamber 125 which can be used in the gas turbine described with reference to FIG. 1 instead of the combustion chamber 25 from FIG. 1. The combustion chamber 125 comprises an inner combustion chamber wall 151 and an outer combustion chamber wall 153. Between the two combustion chamber walls, cooling air ducts 155 are formed through which compressor air is guided along the inner combustion chamber wall 151 to the burner 27. The inlet openings through which the compressor air enters the cooling air ducts 155 are typically disposed in the vicinity of the combustion chamber output so that the compressor air can flow along as much of the combustion chamber wall 151 as possible.

In the exemplary embodiment shown in FIG. 3, a temperature measuring device 131 is present which comprises a first metal piece inserted in the inner combustion chamber wall 151 and projecting slightly into the interior of the combustion chamber, said metal piece representing the heat absorbing element 133, and a second metal piece incorporated in the outer combustion chamber wall 153 and constituting the measurement end 137. Although the heat absorbing element 133 extends slightly into the combustion chamber in this exemplary embodiment, it can alternatively also be made flush with the inside of the inner combustion chamber wall 151. It is also possible for the heat absorbing element 133 to be provided with a heat-insulating coating and/or an anti-oxidation coating, as is also frequently used for protecting the inside of a combustion chamber wall. The heat absorbing element 133 is in particular made of a high-temperature material. Examples of such materials have already been mentioned in connection with the first exemplary embodiment. Reference is made to these materials.

Between the first metal piece 133 and the second metal piece 137, the temperature measuring device 135 has a metal heat conducting element 135. This is preferably likewise made of a high-temperature material, in particular one of the materials mentioned with reference to the first exemplary embodiment, and in this exemplary embodiment additionally has cooling air openings 141 which enable compressor air flowing through the cooling air ducts 155 to pass through the heat conducting element 135. The through-openings 141 can be seen in FIG. 4 which shows a view of the temperature measuring device 131 along the flow direction of the compressor air through the cooling air duct 155. The through-openings 141 increase the effective surface area of the heat conducting element 135 for transferring heat to the compressor air, thereby improving the cooling effect. In this way, in spite of the relative shortness of the heat conducting element 135 between the heat absorbing element 133 and the measurement end 137 compared to the exemplary embodiment shown in FIG. 1, sufficient cooling can be achieved to enable a conventional temperature sensor 39 to be used at the measurement end 137 for measuring the temperature at said measurement end 137.

Figure 4:
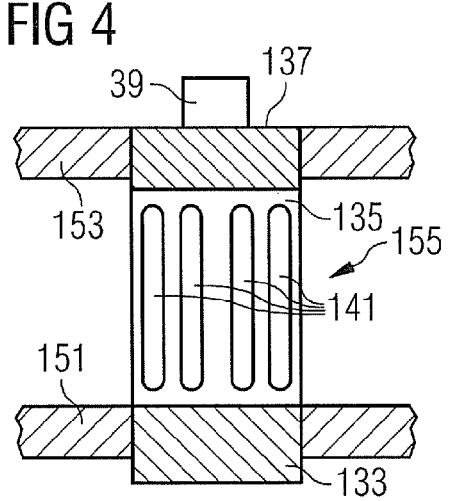
FIG. 4 shows a detail from FIG. 3.

Instead of the variant embodiment of the heat conducting element 135 shown in FIG. 4, other variant embodiments can also be used, e.g. a metal mesh through which the compressor air in the cooling duct 155 can flow. It is merely important for the heat conducting element to be cooled sufficiently. In particular also in the exemplary embodiment shown in FIGS. 3 and 4, the heat conducting element 135 can be of a piece with the heat absorbing element 133 and the measurement end 137.

A third exemplary embodiment of a gas turbine having a temperature measuring device according to the invention will now be described with reference to FIG. 5, which shows a greatly simplified schematic diagram of the gas turbine.

The gas turbine according to the third exemplary embodiment comprises a compressor section 203, a first turbine section 205 and a second turbine section 207. The first and second turbine sections 205, 207 each typically comprises one or two turbine stages. Although in particular the second turbine section 207 can also have more than two turbine stages, the presence of more than two turbine stages in the first turbine section 205 is likewise not ruled out. The gas turbine shown in FIG. 5 comprises a combustion system with two combustion chambers connected in series, a first combustion chamber section 209 with at least one first combustion chamber 210 being disposed between the compressor section 203 and the first turbine section 205. A second combustion chamber section 211 with at least one second combustion chamber 212 is disposed between the first turbine stage 205 and the second turbine stage 207 and connected via a flow path 219 to the output of the first turbine stage to receive the combustion gases.

Figure 5:
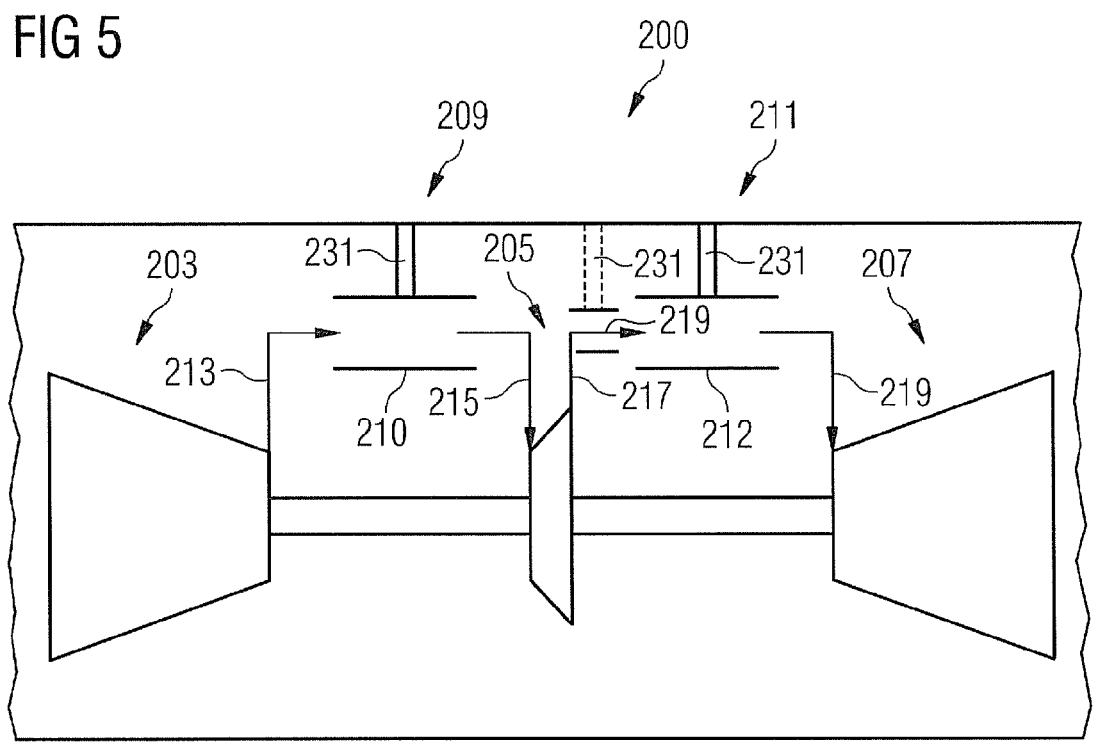
FIG. 5 shows a third exemplary embodiment of a gas turbine with a temperature measuring device according to the invention.

The gas turbine shown in FIG. 5 is designed for sequential combustion in which the compressor air 213 is fed to the at least one first combustion chamber 210 where it is mixed with a fuel and the mixture is combusted. The resulting hot and highly pressurized exhaust gases 215 are fed to the first turbine section 205, where they perform work, expanding and cooling as they do so. The exhaust gases 217 expanded and cooled in the first turbine section 205 are then fed to the at least one combustion chamber 212 in the second combustion chamber section 211, where fuel is again added. The mixture calorically recharged by the supply of fuel is combusted again, and the combustion gases 219 are fed to the second turbine section 207, where they perform work, expanding and cooling as they do so. Compressor air can also be additionally fed to the at least one combustion chamber in the second combustion chamber section. A gas turbine with two-stage combustion is described in U.S. Pat. No. 5,577,378, for example. Reference is made to this publication in respect of the two-stage combustion process.

In gas turbines with sequential combustion, the difficulty described in the introduction of determining the combustion chamber temperature from the temperature at the turbine output is particularly acute. In the prior art, the temperature is generally measured at the turbine output of the second turbine section 207. While the temperature in the at least one combustion chamber 112 in the second combustion chamber section 211 can still be inferred with a sufficient degree of accuracy from this temperature, it is virtually impossible to quantitatively deduce the temperature in the at least one combustion chamber 210 of the first combustion chamber section 209, in particular also because of the turbine stage(s) in the second turbine section 205. This results in difficulties in controlling the fuel supply to the individual combustion chamber stages and makes the control process complex and prone to error.

In this exemplary embodiment, at least the at least one combustion chamber 210 of the first combustion chamber section 209 is equipped with a temperature measuring device of the kind described with reference to FIG. 1 and FIG. 2. However, in particular the at least one combustion chamber 212 of the second combustion chamber section 211 can also be equipped with such a temperature measuring device 231. If the at least one combustion chamber 210 in the first combustion chamber section 209 and/or the at least one combustion chamber 212 in the second combustion chamber section 11 is/are operated with a closed cooling system, a temperature measuring device of the kind described with reference to FIGS. 3 and 4 can be used.

In particular, the presence of the temperature measuring device 231 in the first combustion chamber section 209 makes it easier to control the fuel supply in the sequential combustion process, as it enables the uncertainties in respect of the temperatures obtaining in the at least one combustion chamber 210 of the first combustion chamber section 209 to be eliminated.

As in the first exemplary embodiment, the dissipation of heat via the heat conducting elements can be calibrated during commissioning of the gas turbine. When the temperature measuring devices in the first combustion chamber section are being calibrated, no fuel must be supplied in the second combustion chamber section in order not to invalidate the result.

In a variant of the embodiment shown in FIG. 5 for the gas turbine according to the invention, instead of measuring the temperature in the combustion chamber 210 of the first combustion chamber section 209, the temperature measuring device 231 can also measure the temperature in the flow path 219 between the output of the first turbine section 205 and the input of the at least one combustion chamber 212 of the second combustion chamber section 211. A temperature measuring device disposed accordingly is indicated by dashed lines in FIG. 5. From the temperature measured there, the temperature in the at least one combustion chamber 210 of the first combustion chamber section 210 can then be inferred sufficiently accurately for controlling the fuel supply.

The advantage of disposing the temperature measuring device 231 in the flow path 219 between the output of the first turbine section 205 and the input of the at least one combustion chamber 212 in the second combustion chamber section 211 is that only temperatures of below 1200° C. obtain there, whereas temperatures of approx. 1500° C. obtain in the at least one combustion chamber 210 of the first combustion chamber section 209. Disposing the temperature measuring device 231 in the flow path 219 between the output of the first turbine section 205 and the at least one combustion chamber 212 of the second combustion chamber section 211 therefore enables the temperature stability of the materials used for producing the temperature measuring device 231 to be reduced, thereby making the temperature measuring device 231 more inexpensive to produce.

The inventive temperature measuring device and the inventive method allow, among other things, fuel quantity control to be improved, particularly in the case of sequential combustion gas turbines in which it is only direct determination of the temperature in the combustion chamber in the first combustion chamber section that makes it at all possible to get a picture of the temperatures obtaining there.

It should be pointed out at this point that although only one temperature measuring device per combustion chamber is described in the exemplary embodiments, the number of temperature measuring devices for each combustion chamber can also be more than one. In particular, the temperature measuring device according to the invention can also be used in combustion chambers with more than one burner, e.g. in the case of annular combustors, for monitoring the operation of the individual burners. Depending on the arrangement and number of burners in the combustion chamber, temperature measuring devices according to the invention can then be placed accordingly in the combustion chamber. For example, distributing the temperature measuring devices circumferentially in the combustion chamber enables an uneven temperature distribution found in the combustion chamber to be traced back to one or more particular burners and said uneven temperature distribution to be counteracted by selectively acting on this/these burner(s).

The invention claimed is:

1. A temperature measuring device for measuring a first temperature in a combustion system, comprising:
   a heat absorbing element disposed in or on the combustion system;
   a measurement end disposed remotely from the combustion system and including, disposed thereon, a temperature sensor measuring a second temperature of the measurement end;
   a heat conducting element which connects the heat absorbing element to the measurement end in a thermally conductive manner; and
   a cooling device acting on the heat conducting element in a quantifiable manner for heat removal, and
   wherein the first temperature is determined based on the measured second temperature and the heat removed from the cooling device.

2. The temperature measuring device as claimed in claim 1, wherein an additional temperature sensor measuring a third temperature of the heat conducting element is disposed on the heat conducting element.

3. The temperature measuring device as claimed in claim 1, wherein the cooling device includes a cooling fluid duct in which the heat conducting element is disposed.

4. The temperature measuring device as claimed in claim 3, wherein the heat conducting element has a first large surface area geometry or is connected in a thermally conductive manner to an element having a second large surface area.

5. The temperature measuring device as claimed in claim 4, wherein the first large surface area geometry is embodied in a form of a plurality of cooling fins.

6. The temperature measuring device as claimed in claim 1, wherein the heat absorbing element is a surface or is a section of the heat conducting element.

7. The temperature measuring device as claimed in claim 6, wherein the heat absorbing element has a coating with defined heat-insulating and/or anti-oxidation properties.

8. The temperature measuring device as claimed in claim 1, wherein the heat conducting element and/or the heat absorbing element is/are made of a high-temperature material.

9. The temperature measuring device as claimed in claim 1, wherein the combustion system is the combustion system of a gas turbine.

10. A gas turbine, comprising:
   a combustion system, comprising:
      a temperature measuring device, comprising:
         a heat absorbing element disposed in or on the combustion system;
         a measurement end disposed remotely from the combustion system and including, disposed thereon, a temperature sensor measuring a first temperature of the measurement end;
         a heat conducting element which connects the heat absorbing element to the measurement end in a thermally conductive manner; and
         a cooling device acting on the heat conducting element in a quantifiable manner for heat removal, and
      wherein the temperature in the combustion system is determined based on the measured first temperature and the heat removed from the cooling device.

11. The gas turbine as claimed in claim 10, wherein the heat conducting element of the temperature measuring device is disposed at least partly in a cooling fluid circulating area at least partially surrounding the combustion system.

12. The gas turbine as claimed in claim 10, further comprising a combustion system comprising at least two combustion chambers disposed axially in series and flowed through sequentially, of which at least the upstream combustion chamber is equipped with the temperature measuring device.

13. The gas turbine as claimed in claim 12, wherein the plurality of combustion chambers are each equipped with the temperature measuring device.

14. The gas turbine as claimed in claim 12, wherein a turbine stage is disposed between the two combustion chambers disposed axially in series.

15. The gas turbine as claimed in claim 13, wherein the turbine stage is disposed between the two combustion chambers disposed axially in series.

16. The gas turbine as claimed in claim 10,
   further comprising at least two combustion chambers disposed axially in series and flowed through sequentially, between which lies a flow path, and
   wherein the temperature measuring device is provided in the flow path.

17. The gas turbine as claimed in claim 16, wherein the heat absorbing element has a coating with defined heat-insulating and/or anti-oxidation properties.

18. A method for directly determining a temperature in a combustion system, in which a first quantity of heat from the combustion system is absorbed, the method comprising:
   absorbing the first quantity of heat by providing a heat absorbing element disposed in or on the combustion system;
   transmitting the first quantity of heat absorbed to a temperature sensor disposed remotely from the combustion system in a thermally conductive manner,
   wherein, during the transmitting, a second quantity of heat is removed from the first quantity of heat so that a third quantity of heat reaching the temperature sensor is reduced by a quantifiable amount compared to the first quantity of heat absorbed; and
   determining the temperature in the combustion system from an actual temperature measurement and the second quantity of quantifiably removed heat, and wherein the actual temperature measurement is based on the reduced third quantity of heat.

19. The method as claimed in claim 18, wherein the second quantity of heat is quantifiably removed using a cooling fluid flow.

20. The method as claimed in claim 18, wherein the combustion system is a gas turbine combustion chamber.

* * * * *